(12) United States Patent
Pozzi et al.

(10) Patent No.: US 10,875,651 B2
(45) Date of Patent: Dec. 29, 2020

(54) OVERHEAD BIN MODULAR PANEL

(71) Applicant: B/E Aerospace, Inc., Winston-Salem, NC (US)

(72) Inventors: Alexander N. Pozzi, Winston-Salem, NC (US); Francis Xavier L. Garing, Atlanta, GA (US); Jae Hun Gu, Doraville, GA (US); Alyssa G. Mellett, Kennesaw, GA (US); Julia M. Brooks, Atlanta, GA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 477 days.

(21) Appl. No.: 15/948,178

(22) Filed: Apr. 9, 2018

(65) Prior Publication Data

US 2019/0308726 A1 Oct. 10, 2019

(51) Int. Cl.
*B64D 11/00* (2006.01)
*G09F 23/00* (2006.01)

(52) U.S. Cl.
CPC .......... *B64D 11/003* (2013.01); *B64D 11/00* (2013.01); *G09F 23/00* (2013.01); *B64D 2011/0038* (2013.01)

(58) Field of Classification Search
CPC ............... B64D 11/003; B64D 11/00; B64D 2011/0038; G09F 23/00
See application file for complete search history.

(56) References Cited

U.S. PATENT DOCUMENTS

| | | | | |
|---|---|---|---|---|
| 5,108,048 A | * | 4/1992 | Chang | B64D 11/003 244/118.1 |
| 5,549,258 A | * | 8/1996 | Hart | B64D 11/003 244/118.1 |
| 5,842,668 A | * | 12/1998 | Spencer | B64D 11/003 244/118.1 |
| 5,934,615 A | * | 8/1999 | Treichler | B64D 11/003 244/118.5 |
| 6,733,061 B1 | * | 5/2004 | Dykema | B60R 7/04 296/37.7 |
| 8,317,132 B2 | * | 11/2012 | Pein | B64D 11/003 244/118.5 |
| 8,500,065 B2 | * | 8/2013 | Schmid | B64D 11/00 244/118.5 |
| 8,783,609 B2 | * | 7/2014 | Schneider | B64D 11/003 244/118.5 |
| 8,851,420 B2 | * | 10/2014 | Schliwa | B64D 11/003 244/118.5 |
| 2008/0078871 A1 | * | 4/2008 | Munson | E05B 47/02 244/118.5 |

* cited by examiner

*Primary Examiner* — Assres H Woldemaryam
(74) *Attorney, Agent, or Firm* — Suiter Swantz pc llo

(57) ABSTRACT

A modular panel system for attachment to an overhead stowage bin including an elongate bracket, a plurality of spacers, and at least one panel removably attached to the plurality of spacers without requiring tools to facilitate panel interchangeability independent of stowage bin structure. The at least one panel can be marked with, for example, branding, cabin class designation, advertising or wayfinding.

20 Claims, 5 Drawing Sheets

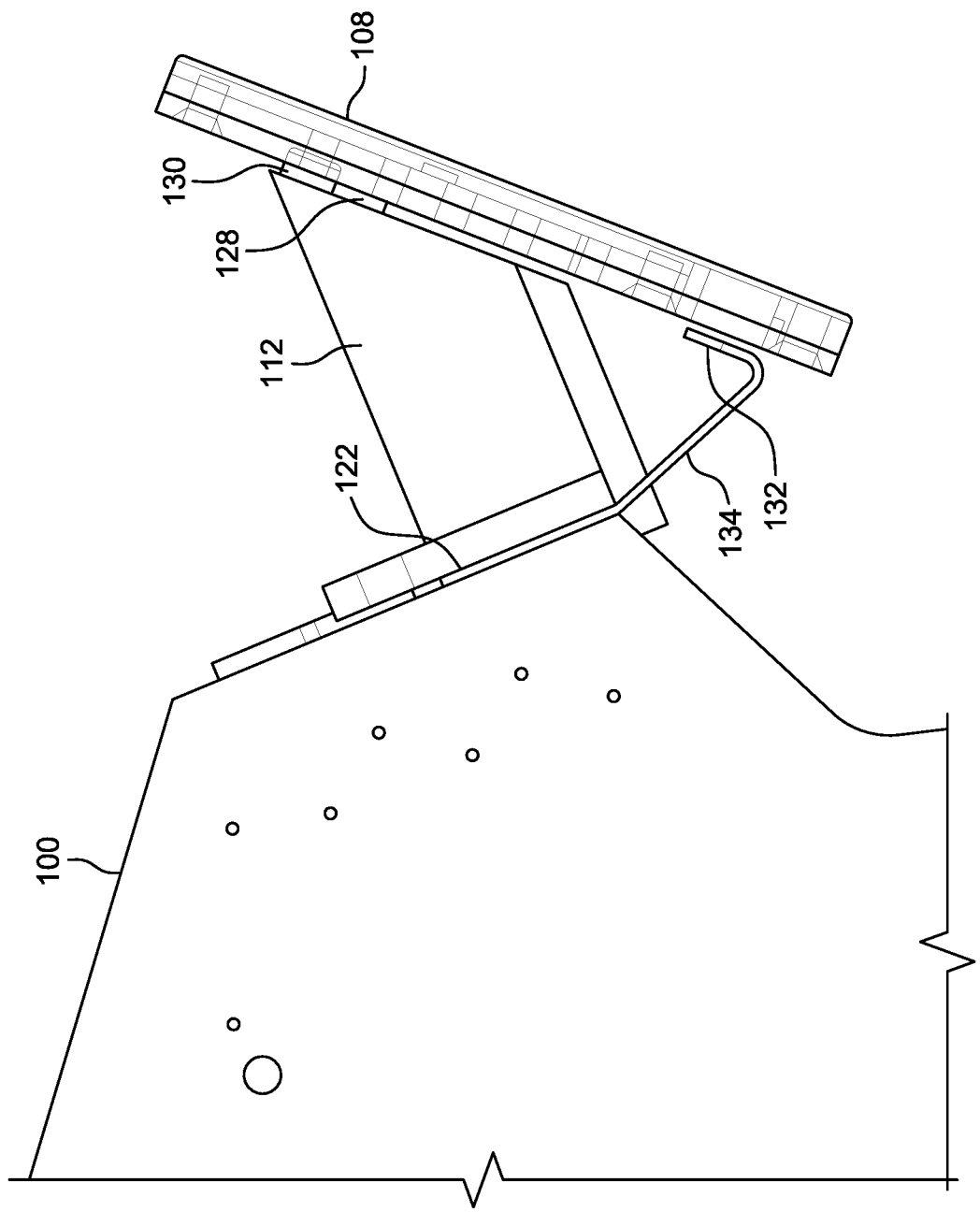

OVERHEAD BIN MODULAR PANEL

BACKGROUND

The inventive concepts disclosed herein are generally directed to customizable visual systems utilized in aircraft interiors, and more particularly, to a modular panel system for aircraft interior overhead bins that can be used for branding, class designation, advertising or wayfinding, among other purposes.

Various locations within aircraft passenger cabins can be marked with visual indicia to indicate seat assignments, exit rows and other information. For example, the panels located immediately below the overhead stowage bins are commonly marked to indicate row numbers, seat assignments and safety information, while exits rows and doors can be marked in other conspicuous locations. Lighting can also be used to direct passengers to exits in the event of an emergency.

Informational marking requires available space and a conspicuous location, both of which are in limited supply in an aircraft passenger cabin. Further, cabin interiors can be updated and reconfigured as the aircraft ages and/or is rebranded, requiring new interior pieces that must be marked and/or rebranded. As such, what is needed is a presently unutilized and conspicuous location within an aircraft passenger cabin for locating class designation, branding, wayfinding, etc. Such solution should also facilitate rapid interchangeability of the visual information displayed.

SUMMARY

In various aspects, embodiments of the inventive concepts disclosed herein are directed to a modular panel system for attachment to an overhead stowage bin including an elongate bracket adapted to be affixed to an exterior surface of an overhead stowage bin above a door of the overhead stowage bin, a plurality of spacers affixed to the elongate bracket at spaced apart locations along a length of the elongate bracket, each of the plurality of spacers extending perpendicularly away from the elongate bracket and including an angled front face and a fastener and an alignment feature disposed on the angled front face, and a panel removably attached to the plurality of spacers and including a front face and a rear face, the rear face including a plurality of receivers for receiving the alignment features of the plurality of spacers.

In a further aspect, the elongate bracket may include a first elongate portion adapted to be affixed to the exterior surface of the overhead bin, a second elongate portion at an angle to the first elongate portion and adapted to be free of attachment to the overhead bin, and a third elongate portion at an angle to the second elongate portion, wherein the third elongate portion and the angled front face of each of the plurality of spacers are coplanar and cooperate to align the panel removably attached to the plurality of spacers.

In another aspect, the fastener of each of the plurality of spacers may be a permanent magnet, and wherein at least a portion of the rear face of the panel may include a ferromagnetic material such that the ferromagnetic material is attracted to the permanent magnet to removably attach the panel to the plurality of spacers.

In another aspect, each of the plurality of spacers may include a base plate affixed to the elongate bracket.

In another aspect, the length of the panel may be less than the length of the elongate bracket.

In another aspect, the front face of the panel may be branded with an aircraft passenger cabin class designation, advertising or wayfinding indicia.

In another aspect, the panel may house a lighting component.

In another aspect, the inventive concepts disclosed herein are directed to an overhead bin modular panel system including an overhead stowage bin including a door and a static structure located above the door, an elongate bracket affixed to the static structure, a plurality of spacers affixed to the elongate bracket at spaced apart locations along a length of the elongate bracket, each of the plurality of spacers extending perpendicularly away from the elongate bracket and including an angled front face and a fastener and an alignment feature disposed on the angled front face, and a panel removably attached to the plurality of spacers, the panel including a front face and a rear face including a plurality of receivers for receiving the alignment features of the plurality of spacers.

In another aspect, the inventive concepts disclosed herein are directed to a modular panel system for attachment to an overhead stowage bin including a plurality of spacers and a panel removably attached to the plurality of spacers, the panel including a front face marked with indicia.

Embodiments of the inventive concepts can include one or more or any combination of the above aspects, features, and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 5 is a side view of the modular panel system.

DETAILED DESCRIPTION OF EXEMPLARY EMBODIMENTS

The inventive concepts are described hereinafter with reference to the accompanying drawings in which exemplary embodiments are shown. However, the inventive concepts may be embodied in many different forms and should not be construed as limited to the representative embodiments set forth herein.

The inventive concepts disclosed herein are generally directed to a modular panel system for aircraft interior overhead stowage bins used for purposes including, but not limited to, branding, class designation, wayfinding or other visual purposes. The panels are interchangeable and removable independent of the bin structure, allowing an airline carrier to customize the overhead bins and cabin interior quickly and without impacting any critical structure. The panels may be attached to the overhead bin structure with a tool-free attachment method, such as mechanical mating features or magnets that promote panel alignment.

Figure 1:
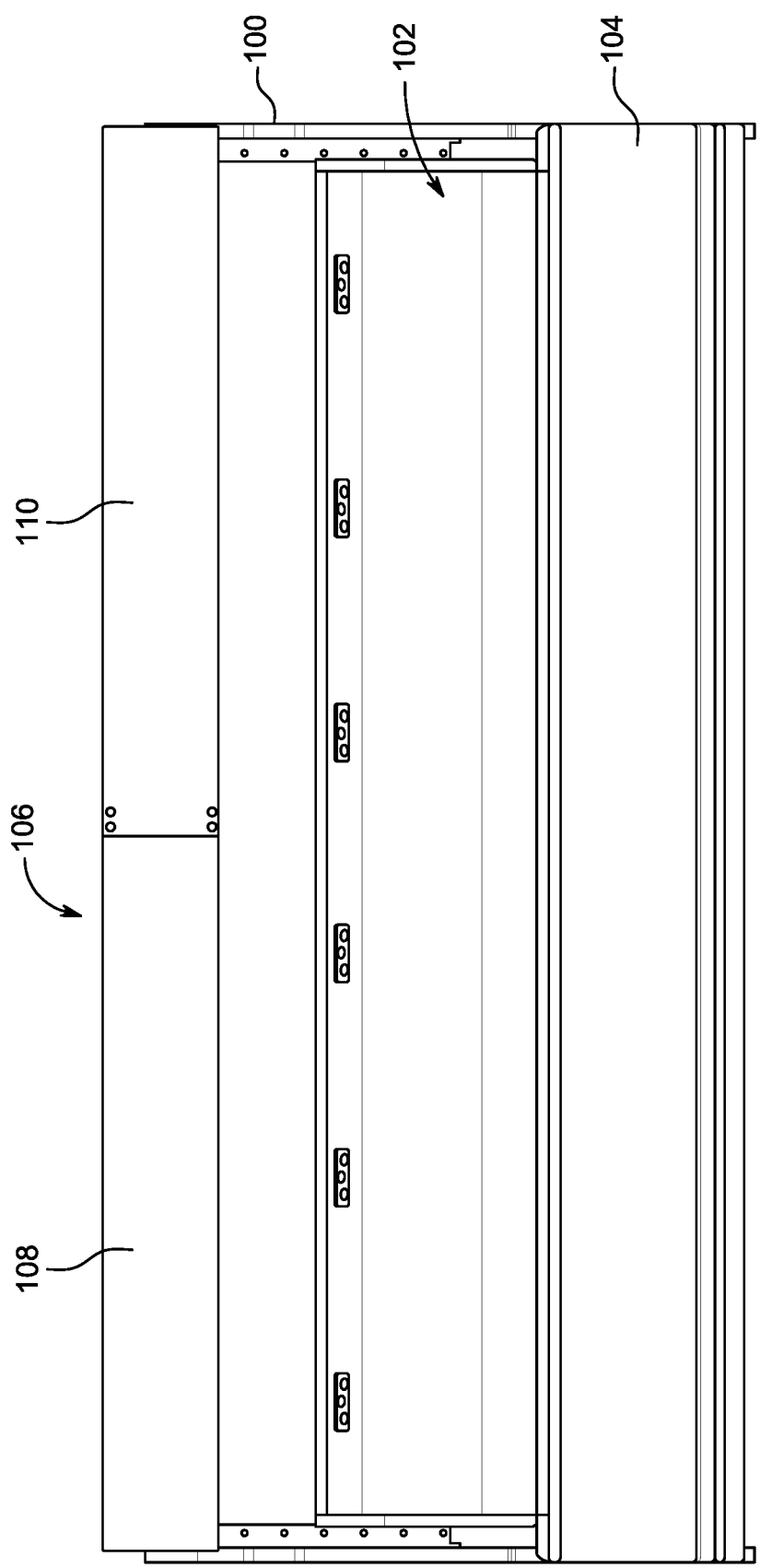
FIG. 1 is a front view of a modular panel system for aircraft interior overhead bins according to the present invention.
Figure 2:
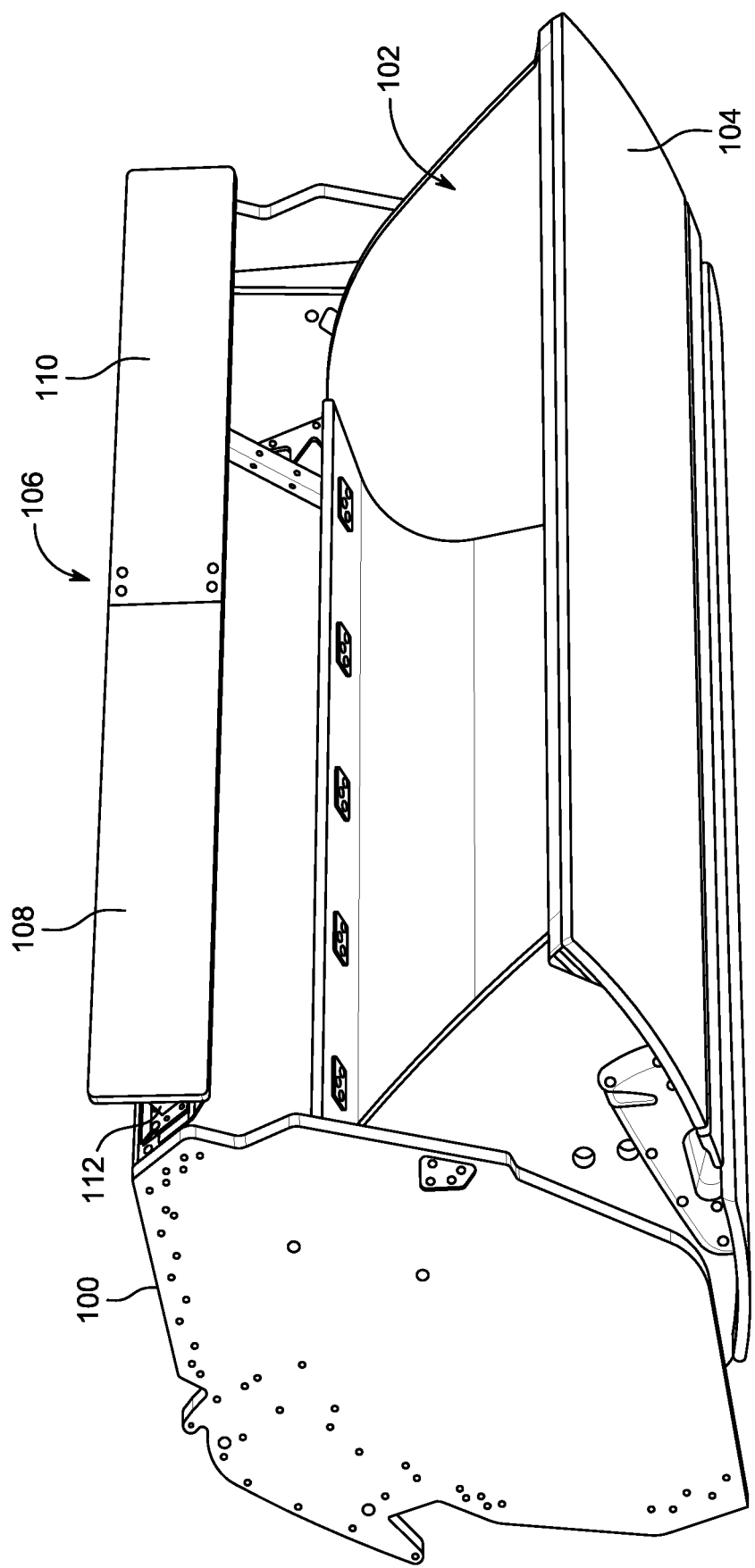
FIG. 2 is a front perspective view the modular panel system, showing an open overhead bin.

Referring specifically to FIGS. 1 and 2, the inventive concepts disclosed herein are generally directed to a panel system for an overhead stowage bin utilized in an aircraft passenger cabin. The overhead stowage bin 100 generally includes an interior compartment 102 for stowing luggage and other articles therein. A door 104 operates to access the interior compartment 102. The door 104 may be hinged to the bin or the door and bin open together as one unit.

The modular panel system 106 mounts to a static structure located above the bin door. As shown, for example, the modular panel system 106 includes individual panels 108, 110 that mount lengthwise in a side-by-side arrangement along a length of the front of the stowage bin. The panels 108, 110 can be mounted horizontally and may be angled toward the aisle or another direction for ease of viewing by passengers traversing down the aisle. The panels 108, 110 are mounted to the stowage bins utilizing a plurality of spacers 112 that serve to space the panels apart from the front of the bin as well as orient the panels at a predetermined angle. The panels 108, 110 are positioned high within the cabin, generally out of reach of the passengers to prevent tampering.

Figure 3:
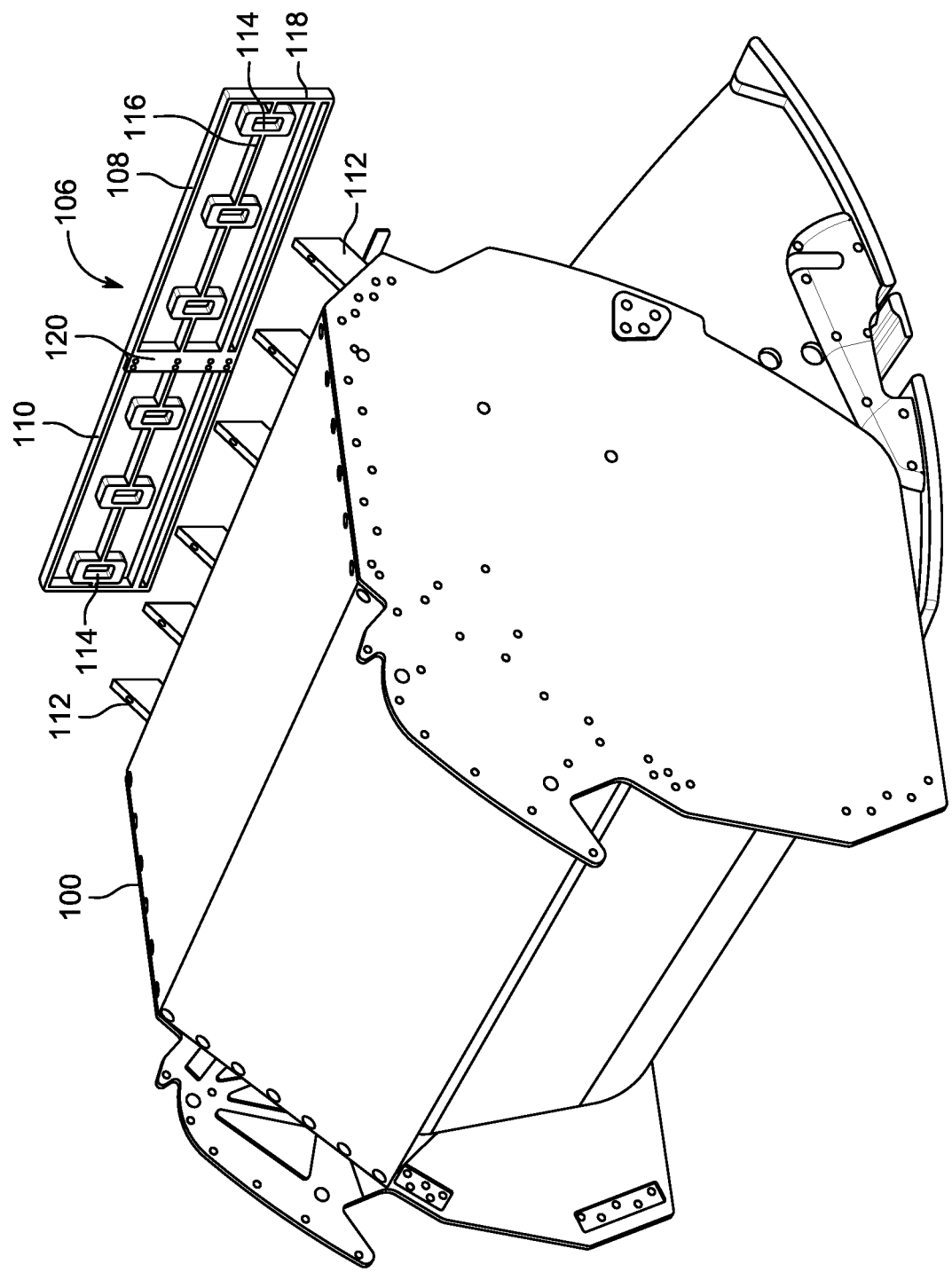
FIG. 3 is a rear perspective view of the modular panel system, showing the panel removed.

Referring to FIG. 3, the plurality of spacers 112 are positioned spaced apart along the length of the front of the stowage bin 100 and extend generally perpendicularly therefrom. The length of the spacers 112 can be customized based on the bin shape and desired location and orientation of the panels 108, 110. For example, it may be desirable to mount the panels 108,110 such that the panels align flush with the door when the door is closed. The spacers 112 can be spaced such that at least two spacers support each panel for stability. As shown, three spacers 112 support each individual panel.

Each panel 108, 110 includes a front face and a rear face. The rear face includes a plurality of receivers 114 positioned to align and engage with corresponding alignment features disposed on the spacer 112. The receivers may be interconnected through stabilizing ribs 116 that prevent the panels from deforming, such as twisting. A perimeter flange 118 may further serve to maintain the shape of the panels. Panels may interconnect and overlap at a flange 120 that serves to align adjacent panels flush.

Figure 4:
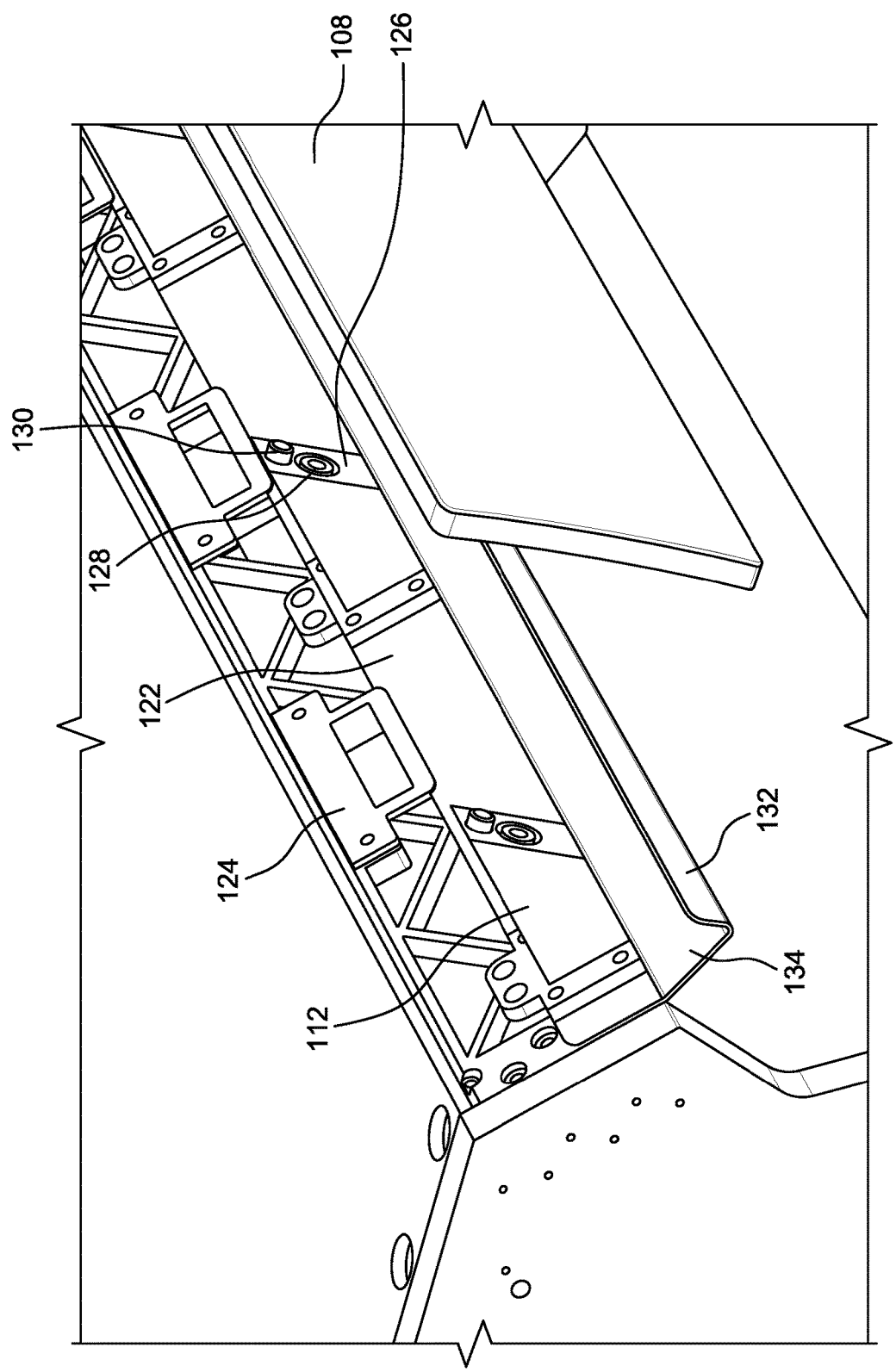
FIG. 4 is a detailed perspective view of the modular panel system, showing the panel removed.

Referring to FIG. 4, the panel system further includes an elongate bracket 122 adapted to be affixed to a static structure of the bin located above the door. The elongate bracket 122 includes a first portion 122 adapted to be affixed to the static bin structure, a second portion 134 at an angle to the first portion 122, and a third portion 132 at an angle to the second portion. Each of the second and third portions 134, 132 are free of direct attachment to the stowage bin. The third portion 132 may be a flange that aligns coplanar with the front face 126 of each of the spacers 112 to cooperatively orient and provide mounting stability to the panels.

Each spacer 112 includes a front face 126 to which the panels mount. A fastener 128 and alignment feature 130 are disposed on the front face 126 of each spacer 112. The alignment feature 130, for example a post, serves to align the panel 108 with respect to the spacers 112. The fastener 128 serves to toollessly attach the removable panel 108. In a particular embodiment, the fastener 128 may be a permanent magnet, and a portion of the panel rear face may include a ferromagnetic material attracted to the permanent magnet to retain the panel in place about the ends of the spacers 112. Other fasteners are envisioned suitable for tool-free attachment of the panels to the spacers, facilitating rapid panel interchangeability. In one embodiment, the alignment feature and fastener functionality may be incorporated into the same component, for example, a magnetized alignment post.

Referring to FIG. 5, the panel system is shown assembled with panel 108 mounted upon at least one spacer 112, and preferably a plurality of spacers. The panel 108 is shown removably attached to the spacer 112 utilizing the alignment feature 130 and fastener 128. The third portion 132 of the elongate bracket 122 supports the lower half of the panel 108 and resists panel movement in the direction of the stowage bin. The third portion 132 can also be configured to cooperate to attach the panel, and may include for example, an additional fastener. As shown, the panel 108 is installed at an angle to vertical.

Each panel may be marked with indicia including, but not limited to, color, texture, coating, upholstery, class designation, seat assignment, general information, branding, egress, wayfinding, etc. The panels may be readily interchanged without requiring tools, and thus can be interchanged between flights, between carriers, upon rebranding or repurposing the aircraft. The panels may further house components such as lighting components.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. An aircraft overhead bin modular panel system, comprising:
    an elongate bracket adapted to be affixed to an exterior surface of an overhead stowage bin above a door of the overhead stowage bin;
    a plurality of spacers affixed to the elongate bracket at spaced apart locations along a length of the elongate bracket, each of the plurality of spacers extending perpendicularly away from the elongate bracket and comprising an angled front face and a fastener and an alignment feature disposed on the angled front face; and
    a panel removably attached to the plurality of spacers, the panel comprising a front face and a rear face, the rear face comprising a plurality of receivers for receiving the alignment features of the plurality of spacers.

2. The aircraft overhead bin modular panel system of claim 1, wherein the elongate bracket comprises a first elongate portion adapted to be affixed to the exterior surface of the overhead bin, a second elongate portion at an angle to the first elongate portion and adapted to be free of attachment to the overhead bin, and a third elongate portion at an angle to the second elongate portion, wherein the third elongate portion and the angled front face of each of the plurality of spacers are coplanar and cooperate to align the panel removably attached to the plurality of spacers.

3. The aircraft overhead bin modular panel system of claim 1, wherein the fastener of each of the plurality of spacers is a permanent magnet, and wherein at least a portion of the rear face of the panel comprises a ferromagnetic material such that the ferromagnetic material is attracted to the permanent magnet to removably attach the panel to the plurality of spacers.

4. The aircraft overhead bin modular panel system of claim 1, wherein each of the plurality of spacers comprises a base plate affixed to the elongate bracket.

5. The aircraft overhead bin modular panel system of claim 1, wherein a length of the panel is less than a length of the elongate bracket.

6. The aircraft overhead bin modular panel system of claim 1, wherein the front face of the panel is branded with an aircraft passenger cabin class designation.

7. The aircraft overhead bin modular panel system of claim 1, wherein the front face of the panel is marked with advertising.

8. The aircraft overhead bin modular panel system of claim 1, wherein the front face of the panel is marked with wayfinding indicia.

9. The aircraft overhead bin modular panel system of claim 1, wherein the panel houses a lighting component.

10. An aircraft overhead bin modular panel system, comprising:
   an overhead stowage bin comprising a door and a static structure located above the door;
   an elongate bracket affixed to the static structure located above the door;
   a plurality of spacers affixed to the elongate bracket at spaced apart locations along a length of the elongate bracket, each of the plurality of spacers extending perpendicularly away from the elongate bracket and comprising an angled front face and a fastener and an alignment feature disposed on the angled front face; and
   a panel removably attached to the plurality of spacers, the panel comprising a front face and a rear face, the rear face comprising a plurality of receivers for receiving the alignment features of the plurality of spacers.

11. The aircraft overhead bin modular panel system of claim 10, wherein the elongate bracket comprises a first elongate portion affixed to the static structure, a second elongate portion at an angle to the first elongate portion and free of attachment to the overhead stowage bin, and a third elongate portion at an angle to the second elongate portion and free of attachment to the overhead stowage bin, wherein the third elongate portion and the angled front face of each of the plurality of spacers are coplanar and cooperatively align the panel removably attached to the plurality of spacers.

12. The aircraft overhead bin modular panel system of claim 10, wherein the fastener of each of the plurality of spacers is a permanent magnet, and wherein at least a portion of the rear face of the panel comprises a ferromagnetic material such that the ferromagnetic material is attracted to the permanent magnet to toolessly removably attach the panel to the plurality of spacers.

13. The aircraft overhead bin modular panel system of claim 10, wherein each of the plurality of spacers comprises a base plate affixed to the elongate bracket.

14. The aircraft overhead bin modular panel system of claim 10, wherein a length of the panel is less than a length of the elongate bracket.

15. The aircraft overhead bin modular panel system of claim 10, wherein the front face of the panel is branded with an aircraft passenger cabin class designation.

16. The aircraft overhead bin modular panel system of claim 10, wherein the front face of the panel is marked with advertising.

17. The aircraft overhead bin modular panel system of claim 10, wherein the front face of the panel is marked with wayfinding indicia.

18. The aircraft overhead bin modular panel system of claim 10, wherein the panel houses a lighting component.

19. An aircraft overhead bin modular panel system, comprising:
   a plurality of spacers adapted to be affixed to a static structure of an overhead stowage bin above a door of the overhead stowage bin, each of the plurality of spacers adapted to extend from the static structure and comprising a front face and an alignment feature disposed on the front face; and
   a panel removably attached to the plurality of spacers such that the panel is spaced apart from the static structure, the panel comprising a front face and a rear face, the rear face comprising a plurality of receivers for receiving the alignment features of the plurality of spacers.

20. The aircraft overhead bin modular panel system of claim 19, wherein the alignment feature is a permanent magnet and the plurality of receivers comprise ferromagnetic material such that the ferromagnetic material is attracted to the permanent magnet to removably attach the panel to the plurality of spacers.

* * * * *